(12) United States Patent
Akiyama (10) Patent No.: US 10,488,596 B2
(45) Date of Patent: Nov. 26, 2019

(54) OPTICAL FIBER MOUNTED PHOTONIC INTEGRATED CIRCUIT DEVICE

(71) Applicants: FUJITSU LIMITED, Kawasaki-shi, Kanagawa (JP); Photonics Electronics Technology Research Association, Bunkyo-ku, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 19 days.

(21) Appl. No.: 15/688,084

(22) Filed: Aug. 28, 2017

(65) Prior Publication Data

US 2018/0067265 A1 Mar. 8, 2018

(30) Foreign Application Priority Data

Sep. 7, 2016 (JP) .................. 2016-174488

(51) Int. Cl.
*G02B 6/36* (2006.01)
*G02B 6/12* (2006.01)
*G02B 6/293* (2006.01)
*G02B 6/30* (2006.01)
*G02B 6/42* (2006.01)

(52) U.S. Cl.
CPC ............. *G02B 6/3632* (2013.01); *G02B 6/12* (2013.01); *G02B 6/29317* (2013.01); *G02B 6/305* (2013.01); *G02B 6/4228* (2013.01); *G02B 2006/12061* (2013.01); *G02B 2006/12085* (2013.01)

(58) Field of Classification Search
None
See application file for complete search history.

(56) References Cited

U.S. PATENT DOCUMENTS

| 6,516,104 | B1 | 2/2003 | Furuyama |
| 7,359,593 | B2 * | 4/2008 | Little ................ G02B 6/1228 385/28 |
| 8,965,153 | B2 * | 2/2015 | Takahashi ............ G02B 6/1228 257/E33.067 |

(Continued)

FOREIGN PATENT DOCUMENTS

| JP | H07-128543 A | 5/1995 |
| JP | 2001-004870 A | 1/2001 |

*Primary Examiner* — Tina M Wong
(74) *Attorney, Agent, or Firm* — Kratz, Quintos & Hanson, LLP (57) ABSTRACT

The invention relates to an optical fiber mounted photonic integrated circuit device, wherein the tolerance for positioning in terms of the coupling between the single mode optical fibers and the optical waveguides provided on the photonic integrated circuit device is increased. An optical waveguide core group is provided in such a manner where a plurality of optical waveguide cores having a portion that is tapered in the direction of the width within a plane are aligned parallel to each other at intervals that allow for mutual directional coupling and that are narrower than the width of the core of the single mode optical fiber, and the inclined connection end surface of the single mode optical fiber and the upper surface of an end portion of the optical waveguide cores face each other for coupling.

11 Claims, 13 Drawing Sheets (56) References Cited

U.S. PATENT DOCUMENTS

| | | | | |
|---|---|---|---|---|
| 9,709,741 B2* | 7/2017 | Yang | G02B 6/305 | |
| 9,746,607 B2* | 8/2017 | Collins | G02B 6/1228 | |
| 2004/0114869 A1* | 6/2004 | Fike | G02B 6/124 | |
| | | | | 385/43 |
| 2010/0086255 A1* | 4/2010 | Ishizaka | G02B 6/1228 | |
| | | | | 385/31 |
| 2011/0205660 A1* | 8/2011 | Komura | B82Y 20/00 | |
| | | | | 360/59 |
| 2012/0321244 A1* | 12/2012 | Suzuki | G02B 6/305 | |
| | | | | 385/14 |
| 2013/0287354 A1* | 10/2013 | Sakai | G02B 6/1228 | |
| | | | | 385/126 |
| 2014/0233901 A1* | 8/2014 | Hatori | G02B 6/43 | |
| | | | | 385/129 |
| 2014/0294341 A1* | 10/2014 | Hatori | G02B 6/12 | |
| | | | | 385/14 |
| 2016/0103279 A1* | 4/2016 | Budd | G02B 6/1228 | |
| | | | | 385/14 |
| 2017/0276879 A1* | 9/2017 | Akiyama | G02B 6/305 | |
| 2017/0276979 A1* | 9/2017 | Li | B65D 65/42 | |
| 2018/0067265 A1* | 3/2018 | Akiyama | G02B 6/12 | |

* cited by examiner

OPTICAL FIBER MOUNTED PHOTONIC INTEGRATED CIRCUIT DEVICE

CROSS-REFERENCE TO RELATED APPLICATION

This application is based upon and claims the benefit of priority of the prior Japanese Patent Application No. 2016-174488, filed on Sep. 7, 2016, the entire contents of which are incorporated herein by reference.

FIELD

The present invention relates to an optical fiber mounted optical integrated circuit device, and to an optical connection structure in a silicon photonic integrated circuit (PIC) device where optical fibers and optical parts are mounted in high density, for example.

BACKGROUND

It is possible to mount optical parts in high density on a silicon photonic integrated circuit (PIC), and it is expected to use this technology in order to implement an optical transceiver made of one chip that covers the transmission capacity of a class of terabits per second. In next-generation supercomputers or next-generation servers, for example, a great number of CPU packages on which CPUs and memories are mounted are arranged in a matrix where it is assumed that the CPU packages are connected in an optical fiber array.

In order to implement an optical transceiver made of one chip that covers the transmission capacity of a class of terabits per second, it is necessary for the optical fibers used for light transmission to be of a single mode in the case of wavelength division multiplexing or long distance transmission.

Si photonic wire waveguides used for silicon PIC's have a size as small as 1 μm or less, and therefore are appropriate for high integration. However, the size is greatly different from that of single mode optical fibers, and therefore, it is a theme to enhance the efficiency in the coupling of the Si photonic wire waveguides with optical fibers.

Figure 13A:
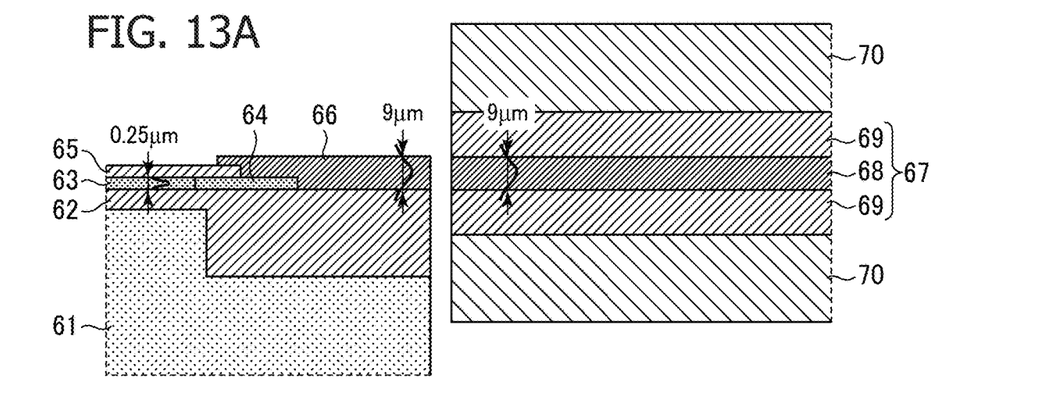
FIGS. 13A and 13B are diagrams illustrating a conventional optical fiber mounted photonic integrated circuit device.
Figure 13B:
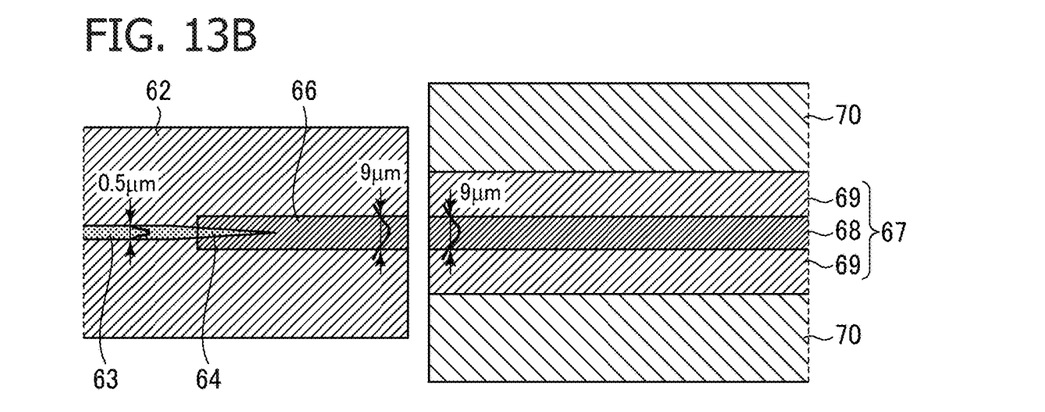

According to a conventional method, a spot size converter of which an end is tapered is used to make the spot size compatible with an optical fiber in order to enhance the efficiency in the coupling with an optical fiber. FIGS. 13A and 13B are diagrams illustrating a conventional optical fiber mounted photonic integrated circuit device. FIG. 13A is a cross-sectional diagram along the optical axis, and FIG. 13B is a plan diagram where the main portions can be clearly seen from the top.

An SOI wafer is used in such a manner that a Si fine wire core 63 having a thickness of 0.25 μm is provided on top of a silicon substrate 61 with a BOX layer 62 that also works as a lower clad layer in between. A spot size converter 64 of which an end is tapered is provided to an end of the Si fine wire core 63. A $SiO_2$ film is provided on the upper surface of the Si fine wire core 63 as an upper clad layer 65, and a wide SiON core 66 is provided so as to cover the sides of the spot size converter 64. A single mode optical fiber 67 is arranged so that the core 68 faces the SiON core 66. Here, 69 and 70 in the figures are a clad and a ferrule, respectively.

As illustrated in the figures, the propagating light beam having a spot diameter of approximately 0.25 μm is expanded through the spot size converter 64 so that the spot diameter is approximately 9 μm in the SiON core 66 when the light beam enters into the core 68 of the single mode optical fiber 67.

PRIOR ART LITERATURE

Patent Literature

Patent Literature 1: Japanese Laid-open Patent Publication No. H07 (1995)-128543
Patent Literature 2: Japanese Laid-open Patent Publication No. 2001-004870

SUMMARY

In the case of the mounting structure in FIGS. 13A and 13B, the spot size of the single mode optical fiber is approximately 9 μm, and therefore, only a shift in the position of several μm is allowed when positioning, and thus, fiber positioning with high precision is required. Accordingly, active alignment is required where light is made to pass through the Si fine wire core, and positioning can be done so that the coupled optical power becomes maximum. Thus, a problem arises that the mounting cost is high as compared to systems where a multimode fiber having a larger diameter is used.

According to an aspect of the embodiments, an optical fiber mounted photonic integrated circuit device, including:
an optical integrated circuit device configured to be provided with an optical waveguide core group where a plurality of optical waveguide cores having portions that are tapered in the direction of the width within a plane are aligned on a substrate; and
a single mode optical fiber having an inclined connection end surface inclined relative to the direction in which light propagates configured to can be optically coupled with the optical waveguide core group, wherein
the optical waveguide cores are aligned parallel to each other at intervals that can allow for mutual directional coupling and that are narrower than the width of the core of the single mode optical fiber, and
the inclined connection end surface of the single mode optical fiber and the upper surface of the end portions of the optical waveguide cores face each other for coupling.

According to one aspect of the invention, it becomes possible to increase the tolerance in the positioning of the coupling between a single mode optical fiber and an optical waveguide provided in a photonic integrated circuit device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
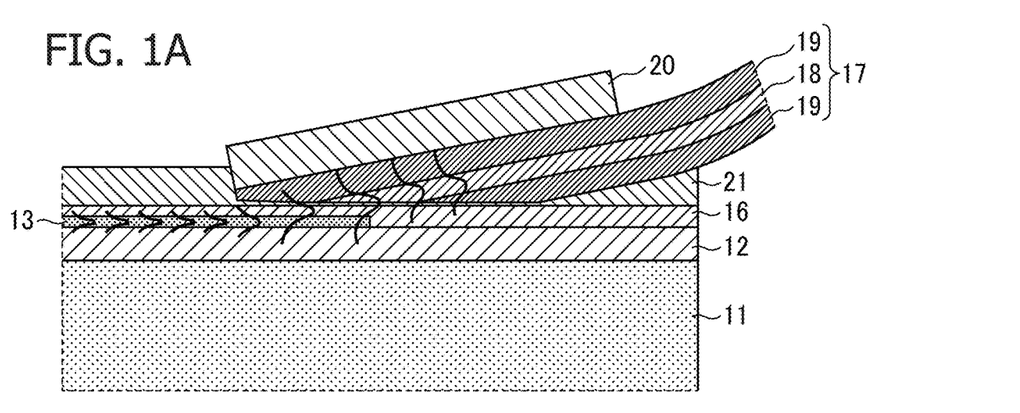
FIGS. 1A and 1B are diagrams illustrating the optical fiber mounted photonic integrated circuit device according to an embodiment of the present invention.
Figure 1B:
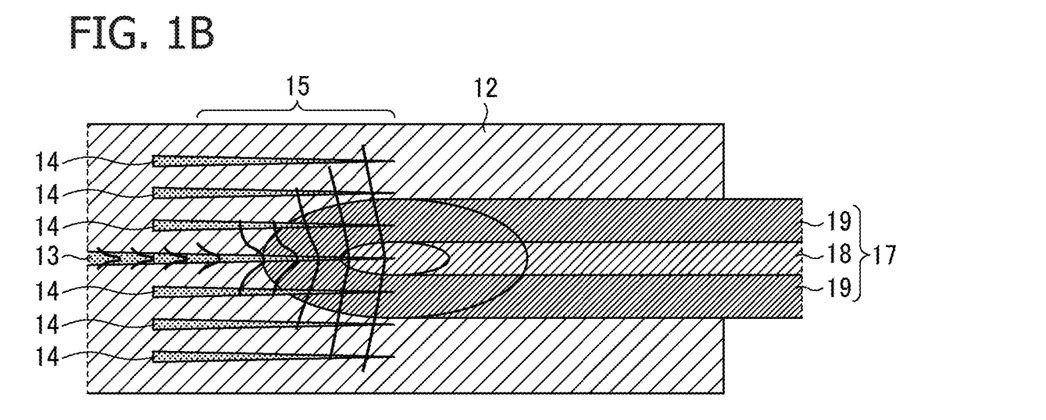

In reference to FIGS. 1A through 5B, the optical fiber mounted photonic integrated circuit device according to an embodiment of the present invention is described below. FIGS. 1A and 1B are diagrams illustrating the optical fiber mounted photonic integrated circuit device according to an embodiment of the present invention. FIG. 1A is a cross-sectional diagram along the optical axis, and FIG. 1B is a plan diagram where the main portions can be clearly seen from the top. As illustrated in the figures, a single mode optical fiber 17 having an inclined connection end surface that is inclined relative to the direction in which light propagates is coupled with a photonic integrated circuit device having an optical waveguide core group where one optical waveguide core 13 and a plurality of optical waveguide cores 14, which have portions 15 that are tapered in the direction of the width within a plane, are aligned on the substrate 11. The optical waveguide cores 13 and 14 are aligned parallel to each other at intervals through which mutual directional coupling is possible and which are narrower than the width of the core 18 of the single mode optical fiber 17. In addition, the inclined connection end surface of the single mode optical fiber 17 faces and couples with the upper surface of the end portions of the optical waveguide cores 13 and 14. Here, the symbols 12, 16, 19, 20 and 21 in the figure are a lower clad layer, an upper clad layer, a clad, a ferrule and a transparent member, respectively.

As illustrated in the figure, light that has propagated through the optical waveguide core 13 from the left to the right spreads into the optical waveguide cores 40 that run parallel to each other and are aligned in the upward and downward directions so as to cover the range that is wider than the diameter of the core 18 of the single mode optical fiber 17. Since the portions 15 are tapered in the direction of the width of the optical waveguide cores 13 and 14, the light spots of the optical waveguide cores 13 and 14 spread in the vertical direction, and at the same time, the light enters into the core 18 of the single mode optical fiber 17 through the coupling via the inclined connection end surface of the single mode optical fiber 17.

Figure 2A:
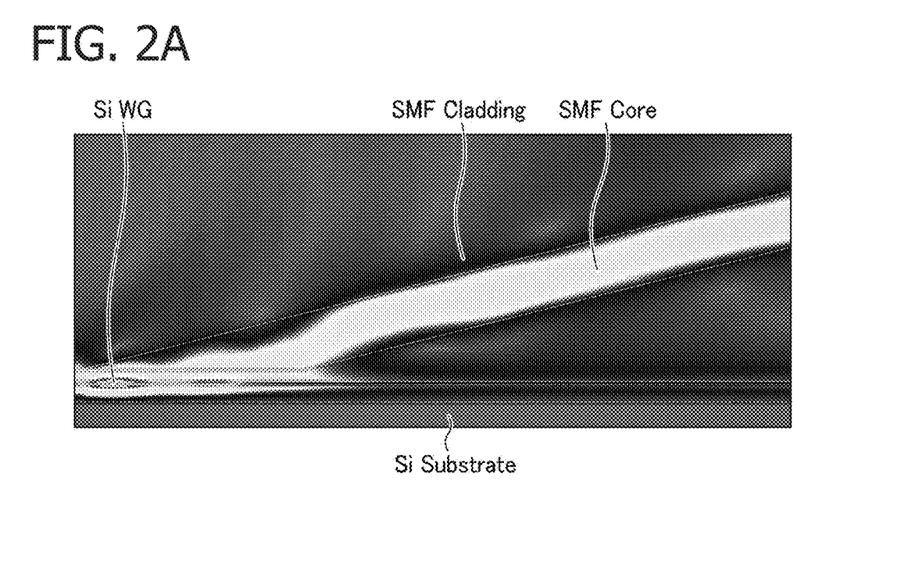
FIGS. 2A and 2B are diagrams illustrating the state how light propagates from the optical waveguide cores to the single mode optical fiber.
Figure 2B:
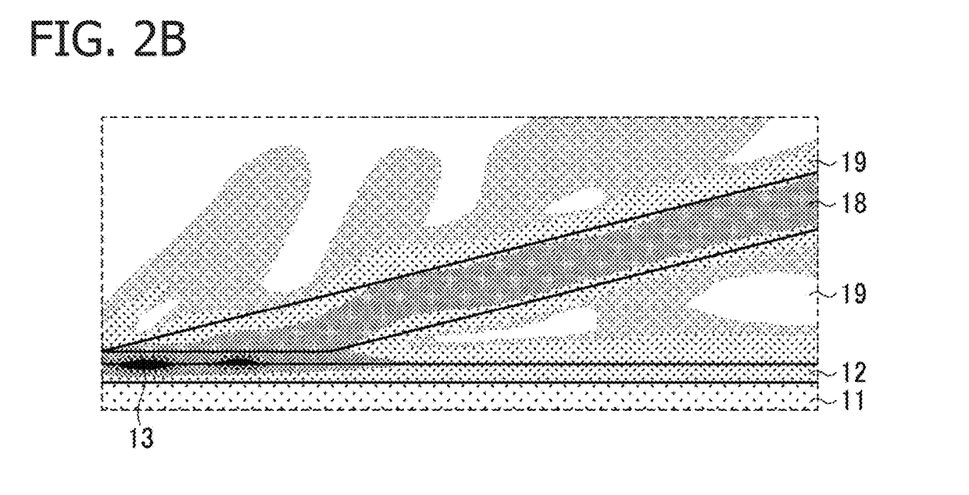

FIGS. 2A and 2B are diagrams illustrating the state how light propagates from the optical waveguide cores to the single mode optical fiber. FIG. 2A illustrates the results of calculation in accordance with a beam propagation method (BPM), and FIG. 2B is a diagram based on FIG. 2A. It can be confirmed from the figures how light shifts upward at the same time as it propagates to the right from the tapered portions 15 beneath the inclined connection end surface of the single mode optical fiber 17, and thus, the light propagates through the core 18 of the single mode optical fiber 17.

Figure 3A:
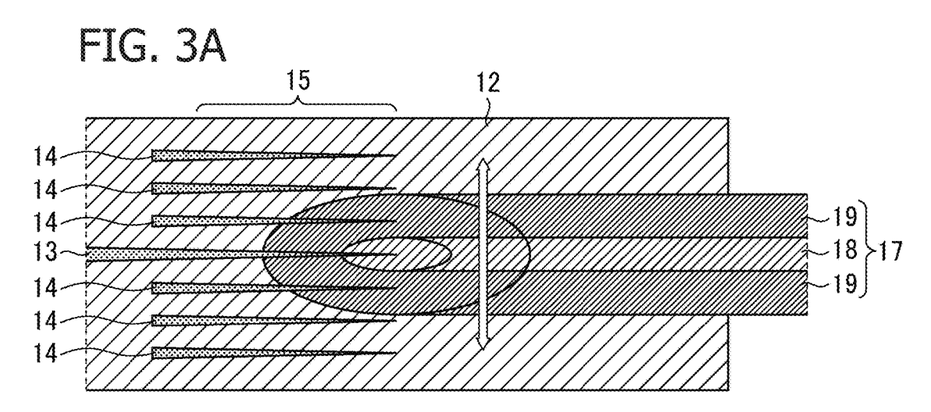
FIGS. 3A and 3B are a diagram and a graph for illustrating tolerance in the lateral direction in the embodiment of the present invention.
Figure 3B:
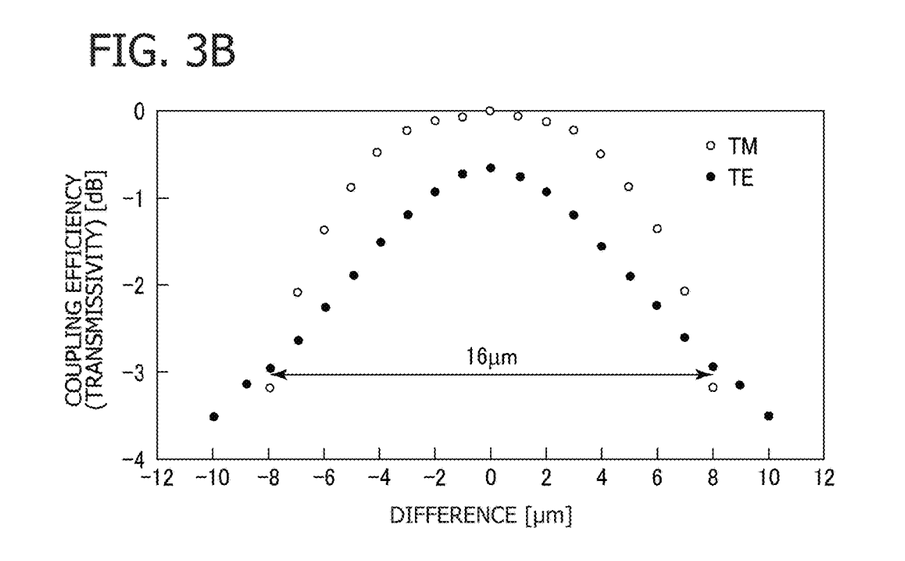

FIGS. 3A and 3B are a diagram and a graph for illustrating tolerance in the lateral direction in the embodiment of the present invention. FIG. 3A is a top diagram illustrating the state how the optical waveguide and the single mode optical fiber are arranged, and FIG. 3B illustrates the results of calculation of the power coupling efficiency between Si fine wire cores and the single mode optical fibers in accordance with BPM. In the case where the single mode optical fiber 17 shifts in the lateral direction (upward and downward directions in the figure) as illustrated in FIG. 3A, a coupling efficiency of −3 dB is gained for the width range of 16 μm for both the TE and TM lights as illustrated in FIG. 3B. A sufficient improvement has been seen as compared to the conventional optical fiber mounted photonic integrated circuit device illustrated in FIGS. 13A and 13B where the tolerance in the lateral direction (loss <3 dB) is approximately 3 μm.

Figure 4A:
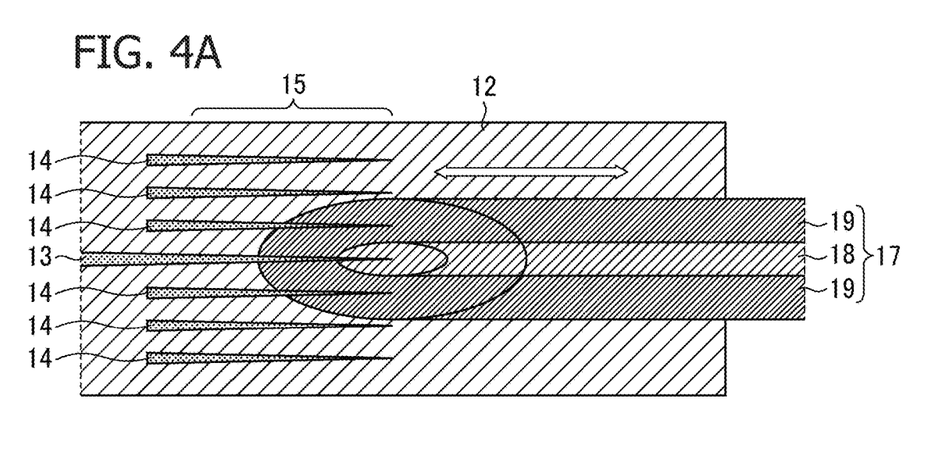
FIGS. 4A and 4B are a diagram and a graph for illustrating the tolerance in the direction of the optical axis in the embodiment of the present invention.
Figure 4B:
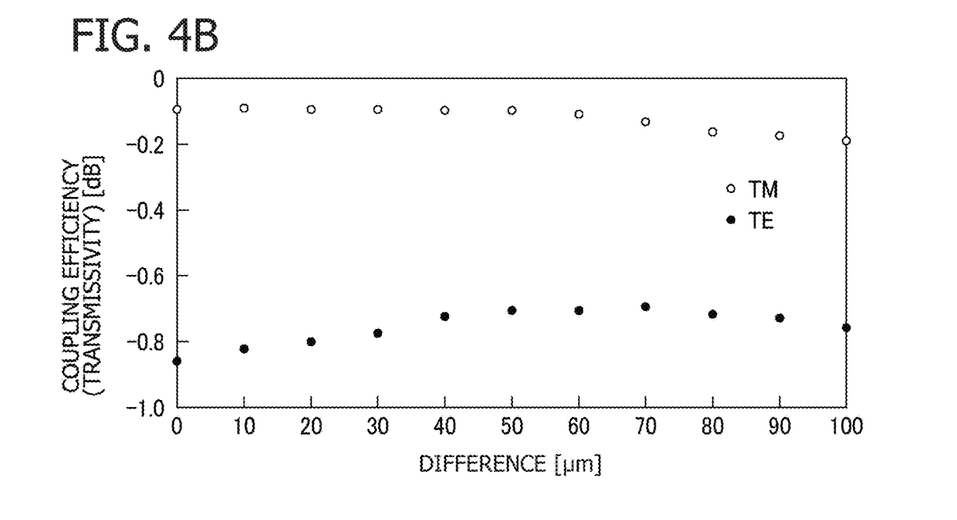

FIGS. 4A and 4B are a diagram and a graph for illustrating the tolerance in the direction of the optical axis in the embodiment of the present invention. FIG. 4A is a top diagram illustrating the state how the optical waveguides and the single mode optical fiber are arranged, and FIG. 4B illustrates the results of calculation of the power coupling efficiency between the Si fine wire cores and the single mode optical fiber in accordance with BPM. In the case where the single mode optical fiber shifts in the direction of the optical axis (directions from left to right or vice versa in the figure) as illustrated in FIG. 4A, the coupling efficiency barely changes over a range as wide as 100 μm as illustrated in FIG. 4B. As a result, a great improvement has been seen as compared to the conventional optical fiber mounted photonic integrated circuit device illustrated in FIGS. 13A and 13B where the tolerance in the direction of the optical axis (loss <3 dB) is approximately 3 μm.

Figure 5A:
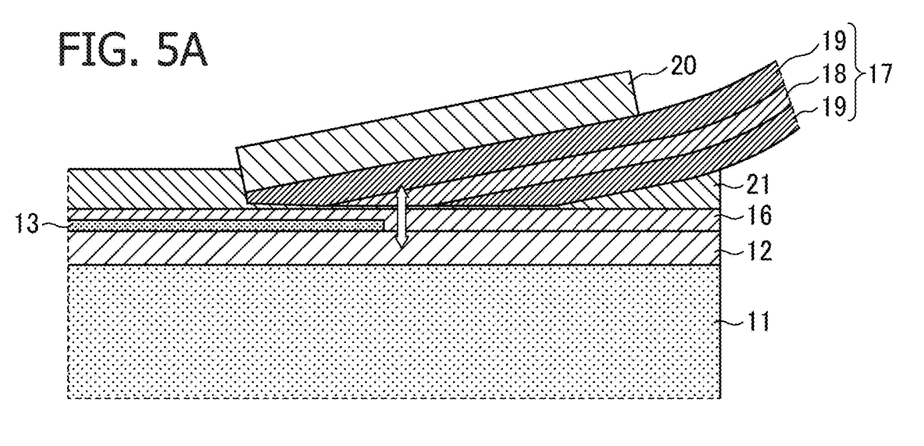
FIGS. 5A and 5B are a diagram and a graph for illustrating the tolerance in the vertical direction in the embodiment of the present invention.
Figure 5B:
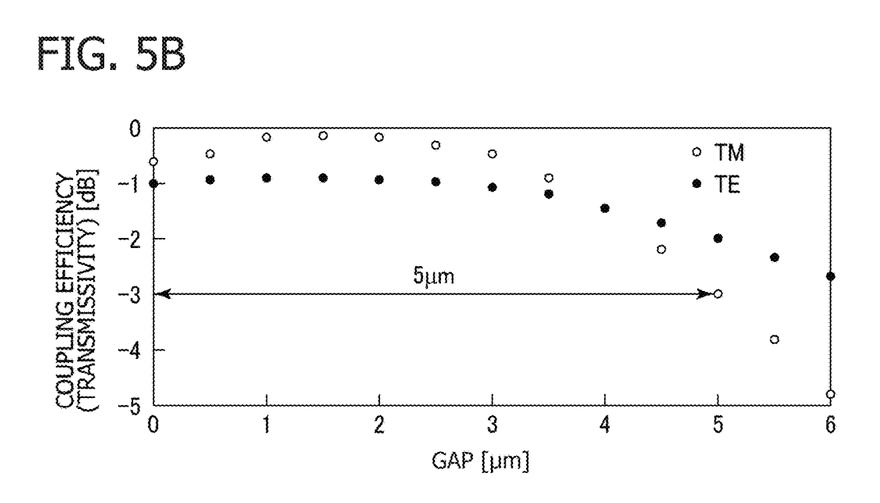

FIGS. 5A and 5B are a diagram and a graph for illustrating the tolerance in the vertical direction in the embodiment of the present invention. FIG. 5A is a cross-sectional diagram illustrating the state how the optical waveguides and the single mode optical fiber are arranged, and FIG. 5B illustrates the results of calculation of the power coupling efficiency between the Si fine wire cores and the single mode optical fiber in accordance with BPM. In the case where the single mode optical fiber 17 shifts in the vertical direction (upward and downward directions in the figure) as illustrated in FIG. 5A, it can be seen from FIG. 5B that the amount of shift in the vertical direction, that is to say, the gap between the optical waveguide cores 13 and 14 and the inclined connection end surface of the single mode optical fiber 17 may be as large as approximately 5 μm. Here, such a gap is generated due to an error in the precision in processing the inclined connection end surface of the single mode optical fiber 17 or by a foreign substance that intervenes in between.

In the embodiment of the present invention, light is made to spread by providing an optical waveguide core group where the optical waveguide cores 13 and 14 having the portions 15 that are tapered in the direction of the width within the plane are aligned, and therefore, the tolerance for adjusting the position for the coupling with the single mode optical fiber 17 can be made large. As a result, optical fiber connection is possible with a simple positioning mechanism, and thus, it is possible to achieve high coupling efficiency with an inexpensive mechanism and an inexpensive mounting apparatus.

As for the optical waveguide cores 13 and 14, it is desirable for the optical waveguide cores 14 to be aligned in such a manner as to be line symmetric with the optical waveguide core 13 at the center. Thus, a smooth transition of light can be achieved in the symmetric structure.

It is desirable for the end portion of the optical waveguide core 13 at the center to have the same structure as the end portions of the optical waveguide cores 14. However, the end portion of the optical waveguide core 13 at the center may have a form that is different from the end portions of the optical waveguide cores 14. For example, the end portion of the optical waveguide core 13 at the center may start tapering at the same point as the optical waveguide cores 14, but may not necessarily start at the same point.

It is desirable for the number of optical waveguide cores 13 and 14 in the optical waveguide core group to be three through seven.

A plurality of optical waveguide core groups may be aligned parallel to each other in the direction in which light propagates so that single mode optical fibers 17 of which the number corresponds to the number of optical waveguide core groups can be arranged, which makes it possible to connect CPU packages in an optical fiber array.

A plurality of optical waveguide core groups may be arranged in a two-dimensional matrix so that single mode optical fibers 17 of which the number corresponds to the number of optical waveguide core groups can be arranged. As a result, it becomes possible to connect CPU packages with a high degree of integration in an optical fiber array in next-generation supercomputer servers.

A silicon photonic integrated circuit device can be cited as an example of the photonic integrated circuit device. In this case, the optical waveguide cores 13 and 14 are formed of silicon fine wire cores, the lower clad layer 12 is a BOX layer, and the upper clad layer 16 is formed of $SiO_2$. Alternately, $SiO_2$ doped with Ge may be used instead of Si, or SiON may be used for the optical waveguide cores 13 and 14.

The transparent member 21, which is either a liquid or a resin that is transparent for propagating light, may be provided between the inclined connection end surface of the single mode optical fiber 17 and the upper surface of the optical waveguide core group.

The ferrule for fixing the single mode optical fiber 17 may be provided. In this case, it is desirable to provide a positioning mechanism for positioning the ferrule 20 on the substrate 11 of the photonic integrated circuit device. As for the positioning mechanism, positioning holes are provided in the ferrule 20 and the substrate 11 so that a guide pin can be inserted into these positioning holes. As for the positioning holes, one may pass through either the ferrule 20 or the substrate 11, and the other may have a certain depth either in the substrate 11 or the ferrule 20.

A typical shape of the positioning holes and the guide pin is a column. However, the shape is not limited to this and may be a prism or tapered shape. A typical material of the guide pin is a metal, but there is no limitation to this. The error in the precision for positioning may be as large as to exceed 10 μm, and therefore, various types of positioning mechanisms that tolerate this degree of error are possible. For example, a step into which the outer shape of the ferrule 20 can be engaged may be created in the substrate 11 of the photonic integrated circuit device for positioning, or conversely, a step into which the outer shape of the substrate 11 of the photonic integrated circuit device can be engaged may be created on the ferrule 20 side.

In the case where the single mode optical fiber 17 is engaged with the ferrule 20 and is fixed on the photonic integrated circuit device side as described above, a first engaging mechanism may be provided on the ferrule 20, and at the same time, a second engaging mechanism that is to be engaged with the first engaging mechanism may be provided on the substrate 11 of the photonic integrated circuit device. At this time, it is desirable to further provide a weight applying mechanism for applying weight on the photonic integrated circuit side at the time of engagement.

It is desirable for the angle of the inclined connection end surface of the single mode optical fiber to be 80 degrees or greater relative to a plane that is vertical to the direction of the fiber access, which can decrease the coupling loss. The closer to 90 degrees this angle is, the better.

Example 1

Figure 6A:
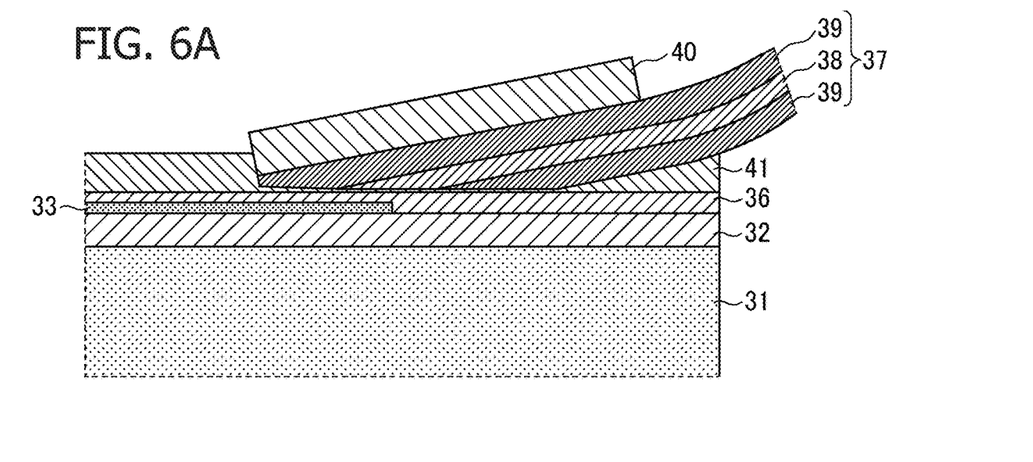
FIGS. 6A and 6B are diagrams for illustrating the optical fiber mounted photonic integrated circuit device according to Example 1 of the present invention.

Next, the optical fiber mounted photonic integrated circuit device according to Example 1 of the present invention is described in reference to FIGS. 6A through 8. FIGS. 6A and 6B are diagrams for illustrating the optical fiber mounted photonic integrated circuit device according to Example 1 of the present invention. FIG. 6A is a cross-sectional diagram along the optical axis, and FIG. 6B is a top diagram where some portions are transparent so that the main portions can be seen. As can be seen from the figures in the structure that utilize an SOI wafer, the main Si fine wire core 33 with a thickness of 0.25 μm having a tapered portion 35 that becomes a spot size converter is provided on top of a single crystal Si substrate 31 with a BOX layer 32 with a thickness of 3 μm that also works as a lower clad layer. In addition, a plurality of sub-Si fine wire cores 34 with a thickness of 0.25 μm having tapered portions 35 are arranged so as to be parallel to the main Si fine wire core 33. Here, the number of sub-Si fine wire cores 34 is six, and they are provided in a line symmetric manner relative to the main Si fine wire core 33. A $SiO_2$ film with a thickness of 1 μm is provided on top of the main Si fine wire core 33 and the sub-Si fine wire cores 34 as an upper clad layer 36.

Figure 6B:
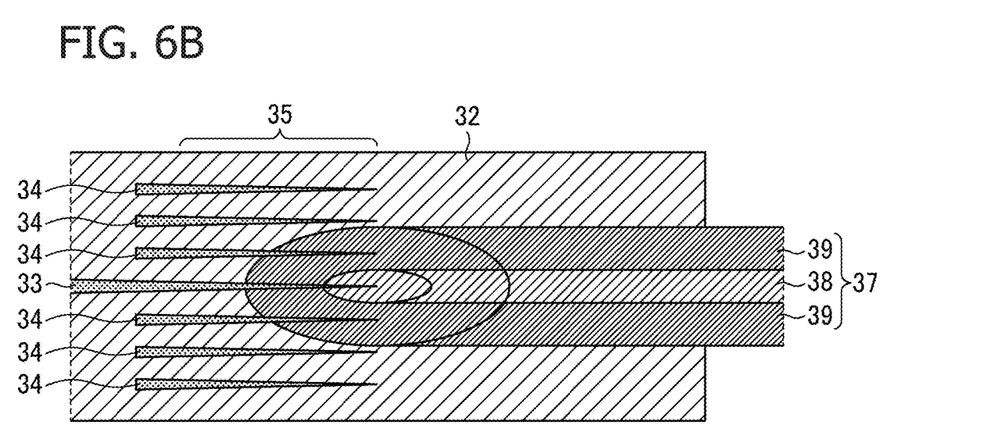

A single mode optical fiber 37 having an inclined connection end surface that is inclined relative to the direction in which light propagates is engaged with a ferrule 40 and coupled with the upper surface of the end portions of the main Si fine wire core 33 and the sub-Si fine wire cores 34 with a transparent oil 41 in between. Here, 18061 (category number of a product made by Cargille Labs) is used as the transparent oil 41. In addition, the coupling loss can be decreased by making the angle of the inclined connection end surface 80 degrees or greater. The closer to 90 degrees this angle is, the better, and here, the angle is 88 degrees. Though the transparent oil 41 is used as the transparent member, a transparent resin such as GA700H (model number of a product made by NTT-AT Corporation) may be used.

Figure 7A:
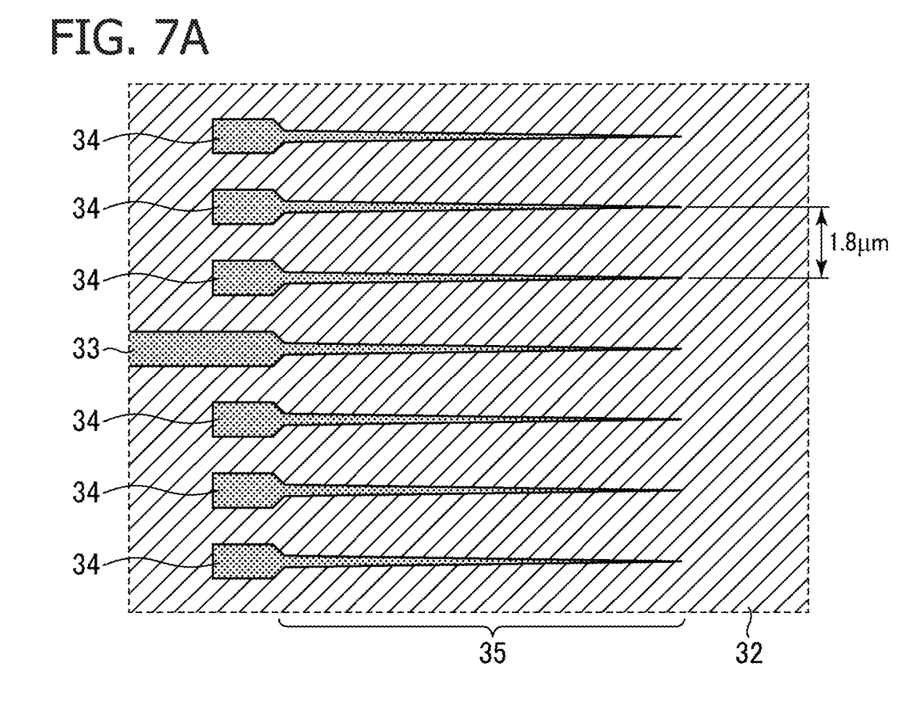
FIGS. 7A and 7B are diagrams for illustrating the junction portion of the optical fiber mounted photonic integrated circuit device according to Example 1 of the present invention.
Figure 7B:
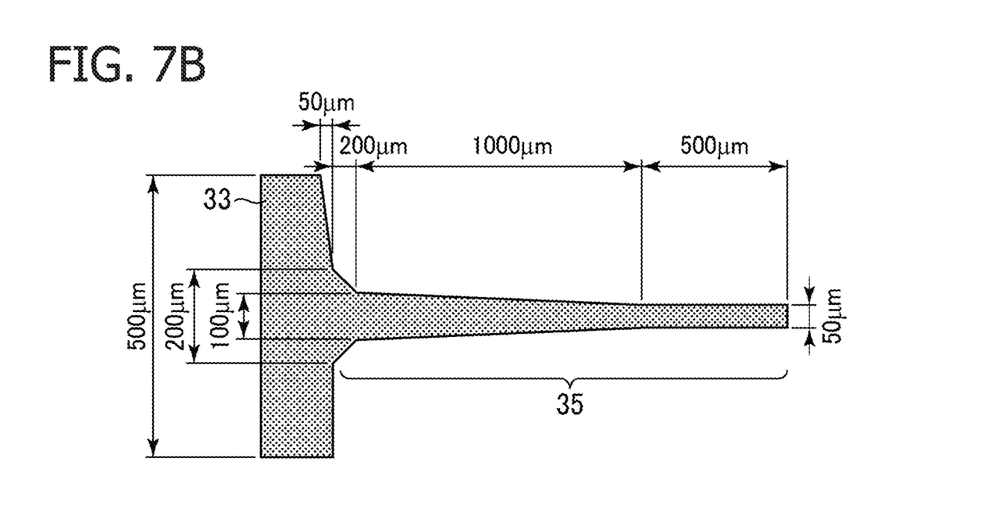

FIGS. 7A and 7B are diagrams for illustrating the junction portion of the optical fiber mounted photonic integrated circuit device according to Example 1 of the present invention. FIG. 7A is a plan diagram illustrating the junction portion and its vicinity on the photonic integrated circuit side, and FIG. 7B is a diagram illustrating an enlargement of the tapered portion of the main Si fine wire core. As illustrated in FIG. 7A, the main Si fine wire core 33 and the sub-Si fine wire cores 34 are aligned parallel to each other at intervals that allow for mutual directional coupling and that are narrower than the width of the core 38 of the single mode optical fiber 37, which is, for example, 9 μm. Here, the Si main fine wire cores 33 and 34 are at a pitch of 1.8 μm. The symbol 39 in the figures is the clad of the single mode optical fiber 37.

As illustrated in FIG. 7B, the main Si fine wire core 33 is made of the main waveguide portion having a width of 500 nm and a tapered portion 35. The tapered portion 35 is made of a first tapered portion having a length of 50 μm of which the width varies from 500 nm to 200 nm, a second tapered portion having a length of 1,000 μm of which the width varies from 100 nm to 50 nm, and an end portion having a length of 500 μm of which the width is constant at 50 nm. Here, these numeric values are examples, and other forms are possible.

As illustrated in FIG. 7A, the form of the tapered portions 35 of the sub-Si fine wire cores 34 is the same as the form of the main Si fine wire core 33, and the end portions of the tapered portions 35 on the root side of the respective sub-Si fine wire cores 34 are located on the same line in the direction vertical to the optical axis. In this case, the form of the respective sub-Si fine wire cores 34 is an example, and different forms are possible. In addition, the end portions of the tapered portions 35 on the root side of the respective sub-Si fine wire cores 34 may be located at different points on different lines in the direction vertical to the optical axis.

Figure 8:
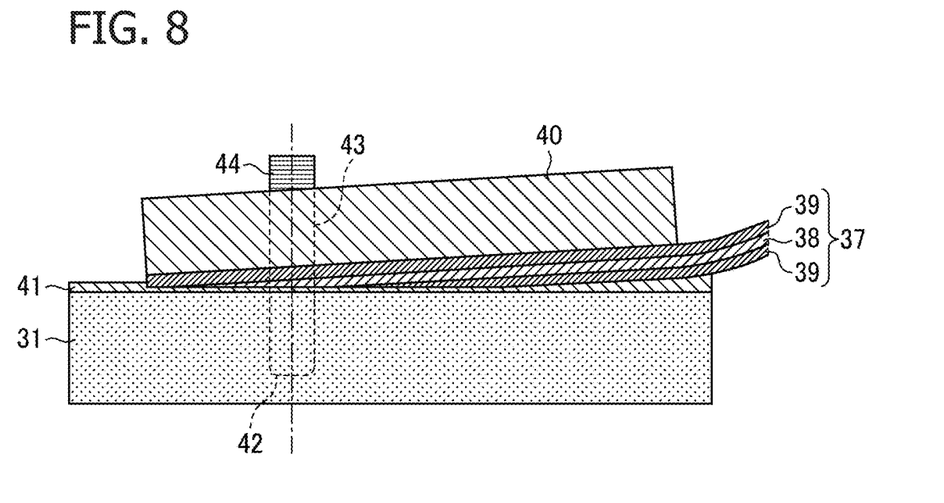
FIG. 8 is a diagram for illustrating the positioning mechanism in the optical fiber mounted photonic integrated circuit device according to Example 1 of the present invention.

FIG. 8 is a diagram for illustrating the positioning mechanism in the optical fiber mounted photonic integrated circuit device according to Example 1 of the present invention. A positioning hole 42 having a certain depth is provided in the single crystal Si substrate 31 on the photonic integrated circuit side, a positioning hole 43 is provided in the ferrule 40 so as to pass through the ferrule 40, and a guide pin 44 is inserted through the positioning holes 42 and 43 for positioning. Here, the center axis of the guide pin 44 is located in proximity to the center of the core 38 of the inclined connection surface in the direction perpendicular to the optical axis; however, there may not necessarily be such a limitation side.

In Example 1 of the present invention, the main Si fine wire core 33 and the sub-Si fine wire cores 34 are aligned parallel to each other at intervals that can allow for mutual directional coupling and that are narrower than the width of the core 38 of the single mode optical fiber 37, and therefore, the tolerance for positioning can be made large. Typically, as a result of improvement in the invention, the tolerance for positioning can allow the coupling point between the single mode optical fiber 37 and the main Si fine wire core 33 to shift several times greater in the lateral direction and several tens of times greater in the direction of the optical axis than in the prior art. Thus, optical fiber connection becomes possible with a simple positioning mechanism, and then, it is possible to achieve high coupling efficiency with an inexpensive mechanism and an inexpensive mounting apparatus.

Example 2

Figure 9:
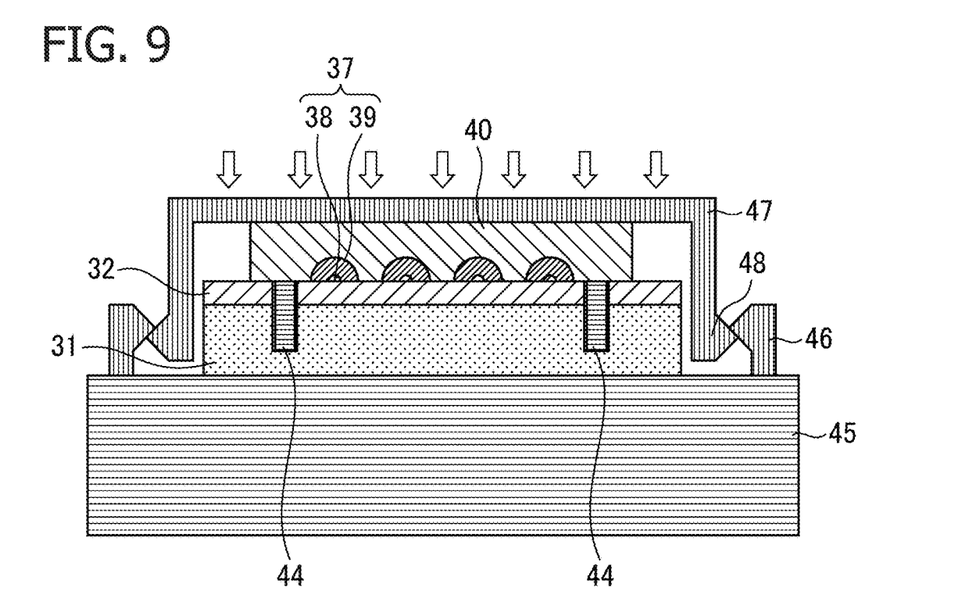
FIG. 9 is a diagram for illustrating the structure for mounting the optical fiber mounted photonic integrated circuit device according to Example 2 of the present invention.

Next, the optical fiber mounted photonic integrated circuit device according to Example 2 of the present invention is described in reference to FIG. 9. FIG. 9 is a diagram for illustrating the structure for mounting the optical fiber mounted photonic integrated circuit device according to Example 2 of the present invention. The Si photonic integrated circuit device is mounted on a mounting substrate 45, and guide pins 44 that are fixed to the ferrule 40 are inserted into the positioning holes provided in the single crystal Si substrate 31 for positioning.

The engaging member 46 provided on the mounting substrate 45 and the engaging member 48 that is provided to the lid 47 for pressing the ferrule 40 are engaged with each other, and as a result, a load is applied in such a manner that the ferrule 40 is pressed towards the Si photonic integrated circuit device side, and thus, the contact between the Si photonic integrated circuit device and the inclined connection end surfaces of the single mode optical fibers 37 is maintained.

As for the weight applying mechanism, the engaging mechanism is not limited to the one illustrated in the figures, and any mechanism that can apply weight required for maintaining the contact between the Si photonic integrated circuit device and the inclined connection end surface of the single mode optical fiber 37. For example, a mechanism for fixing a lid 47 that is placed on the ferrule 40 with bolts may be used, or a structure for applying weight with a spring in between in order to prevent excessive weight from being applied may be used.

Example 3

Figure 10:
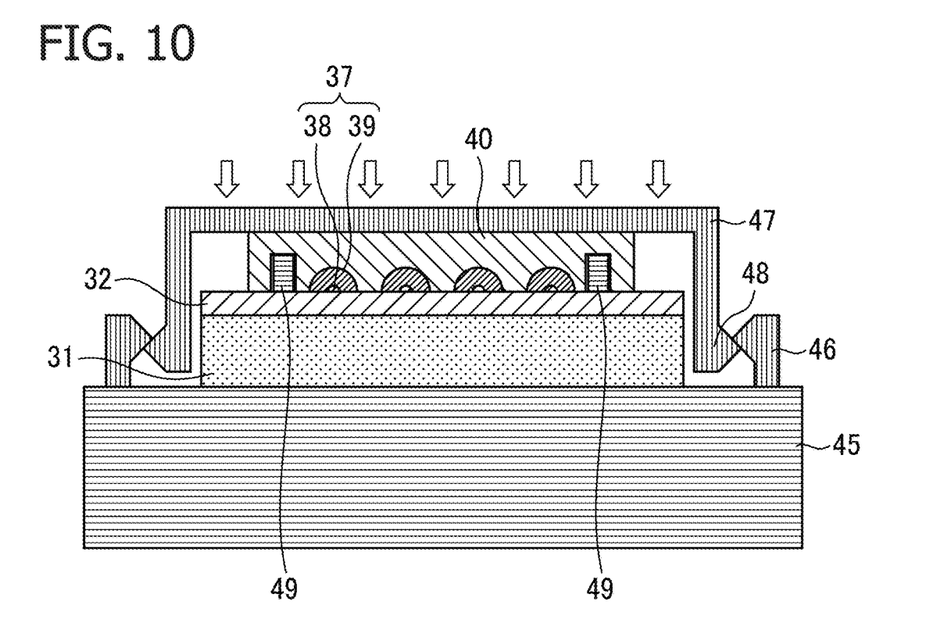
FIG. 10 is a diagram for illustrating the structure for mounting the optical fiber mounted photonic integrated circuit device according to Example 3 of the present invention.

Next, the optical fiber mounted photonic integrated circuit device according to Example 3 of the present invention is described in reference to FIG. 10. FIG. 10 is a diagram for illustrating the structure where the optical fiber mounted photonic integrated circuit device according to Example 3 of the present invention is mounted and where the basic configuration is the same as in Example 2 illustrated in FIG. 9. In Example 3 of the present invention, however, guide pins 49 are provided on the Si photonic integrated circuit device side and inserted into holes provided in the ferrule 40.

In this case as well, the weight applying mechanism is not limited to the engaging mechanism that is illustrated in the figure, and any mechanism that can apply weight required for maintaining contact between the Si photonic integrated circuit device and the inclined connection end surface of the single mode optical fiber 37 may be used. For example, a mechanism for fixing a lid 47 that is placed on the ferrule 40 with bolts may be used, or a structure for applying weight with a spring in between in order to prevent excessive weight from being applied may be used.

Example 4

Figure 11:
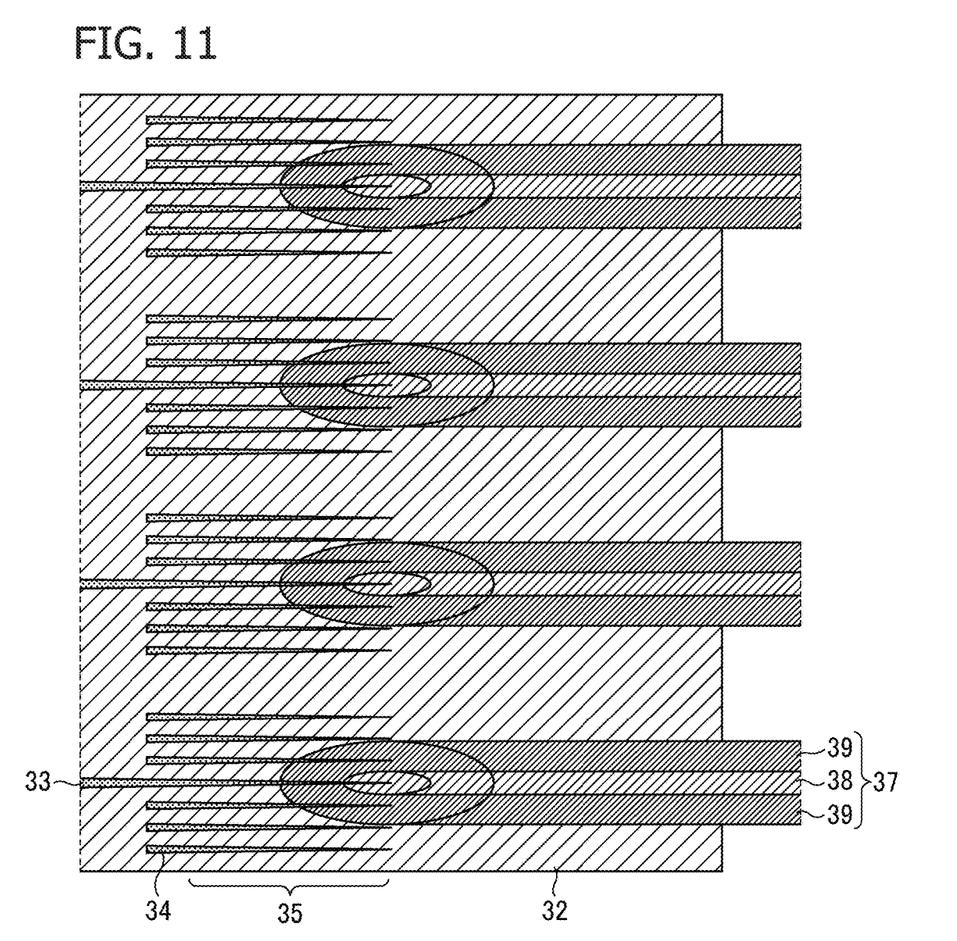
FIG. 11 is a plan diagram for illustrating the main portions of the optical fiber mounted photonic integrated circuit device according to Example 4 of the present invention.

Next, the optical fiber mounted photonic integrated circuit device according to Example 4 of the present invention is described in reference to FIG. 11. FIG. 11 is a plan diagram for illustrating the main portions of the optical fiber mounted photonic integrated circuit device according to Example 4 of the present invention. As illustrated in the figure, Si fine wire core groups, where three sub-Si fine wire cores 34 are aligned on either side of a main Si fine wire core 33, are arranged in a one-dimensional array, and single mode optical fibers 37 having an inclined connection end surface are coupled to the Si fine wire core groups. Here, the coupling state is the same as in Example 1.

When Si fine wire core groups are arranged in a one-dimensional array in this manner, it is possible to connect CPU packages in an optical fiber array. Here, the number of Si fine wire core groups is four, but any number is possible, and it is not necessary for the Si fine wire core groups to be arranged regularly.

Example 5

Figure 12:
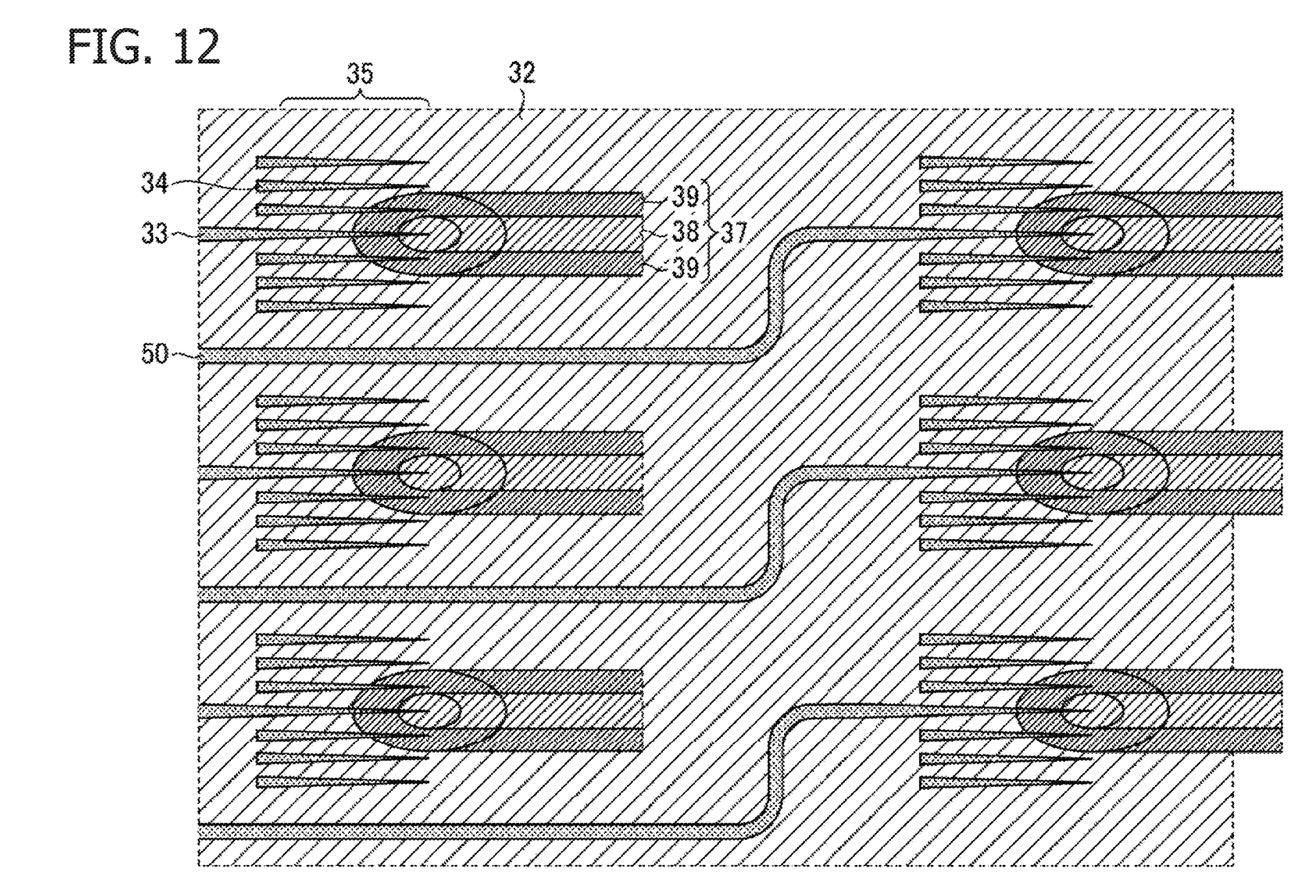
FIG. 12 is a plan diagram for illustrating the main portions of the optical fiber mounted photonic integrated circuit device according to Example 5 of the present invention.

Next, the optical fiber mounted photonic integrated circuit device according to Example 5 of the present invention is described in reference to FIG. 12. FIG. 12 is a plan diagram for illustrating the main portions of the optical fiber mounted photonic integrated circuit device according to Example 5 of the present invention. As illustrated in the figure, Si fine wire core groups, where three sub-Si fine wire cores 34 are aligned on either side of a main Si fine wire core 33, are arranged in a two-dimensional array, and single mode optical fibers 37 having an inclined connection end surface are coupled to the Si fine wire core groups. In the arrangement of the Si fine wire core groups in the two-dimensional array, other main Si fine wire cores 50 are aligned between the respective Si fine wire core groups along a column, and the main Si fine wire cores 50 extend to the points along another column of Si fine wire core groups. Here, the coupling state is the same as in Example 1.

When Si fine wire core groups are arranged in a two-dimensional array in this manner, it is possible to connect CPU packages with a high degree of integration in an optical fiber array. Here, the Si fine wire core groups are arranged in a matrix of 3×2; however, any arrangement is possible. In addition, the main Si fine wire cores 50 are bent relative to the direction in which they extend in order for the respective Si fine wire core groups to be arranged regularly in FIG. 12; however, the main Si fine wire cores 50 may extend linearly to the points along a column of Si fine wire core groups.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical fiber mounted photonic integrated circuit device, comprising:
   an optical integrated circuit device configured to be provided with an optical waveguide core group where a plurality of optical waveguide cores having portions that are tapered in the direction of the width within a plane are aligned on a substrate; and
   a single mode optical fiber having an inclined connection end surface inclined relative to the propagation of light configured to be optically coupled with the optical waveguide core group, wherein
   the optical waveguide cores are aligned parallel to each other at intervals that can allow for mutual directional coupling and that are narrower than the width of the core of the single mode optical fiber,
   the inclined connection end surface of the single mode optical fiber and the upper surface of the end portions of the optical waveguide cores face each other for coupling,
   the number of optical waveguide cores in the optical waveguide core group is seven, and
   the optical waveguide cores in the optical waveguide core group connect with a clad layer of the single mode optical fiber.

2. The optical fiber mounted photonic integrated circuit device according to claim 1, wherein the optical waveguide cores include one optical waveguide core at the center, relative to which the other optical waveguide cores are aligned in a line symmetric manner.

3. The optical fiber mounted photonic integrated circuit device according to claim 1 or 2, wherein the end portions of the optical waveguide cores are all in the same shape.

4. The optical fiber mounted photonic integrated circuit device according to claim 1 or 2, wherein the end portion of the optical waveguide core at the center is in a shape that is different from the shape of the end portions of the other optical waveguide cores.

5. The optical fiber mounted photonic integrated circuit device according to claim 1, wherein a plurality of optical waveguide core groups are aligned parallel to each other in the direction n which light propagates, and single mode optical fibers, of which the number corresponds to the number of optical waveguide core groups, are arranged.

6. The optical fiber mounted photonic integrated circuit device according to claim 1, wherein a plurality of optical waveguide core groups are arranged in a two-dimensional matrix, and single mode optical fibers, of which the number corresponds to the number of optical waveguide core groups, are arranged.

7. The optical fiber mounted photonic integrated circuit device according to claim 1, wherein the photonic integrated circuit device is a silicon photonic integrated circuit device, and the optical waveguide cores are made of silicon having the width of hundreds nanometers to thousands of nanometers.

8. The optical fiber mounted photonic integrated circuit device according to claim 1, wherein a transparent member, which is either liquid, semiliquid, or solid that is transparent, semitransparent, or translucent for the propagating light, is intervened between the inclined connection end surface of a single mode optical fiber and the upper surface of an optical waveguide core group.

9. The optical fiber mounted photonic integrated circuit device according to claim 1, further comprising: ferrules for fixing the single mode optical fibers; and positioning mechanisms for positioning the ferrules on the substrate of the photonic integrated circuit device.

10. The optical fiber mounted photonic integrated circuit device according to claim 9, wherein the ferrules have a first engaging member, and the substrate of the photonic integrated circuit device has second engaging members configured to engage with the first engaging members.

11. The optical fiber mounted photonic integrated circuit device according to claim 10, further comprising a weight applying mechanism configured to apply weight to the ferrules toward the photonic integrated circuit side.

* * * * *